US005855020A

United States Patent [19]
Kirsch

[11] Patent Number: 5,855,020
[45] Date of Patent: Dec. 29, 1998

[54] WEB SCAN PROCESS

[75] Inventor: Steven T. Kirsch, Los Altos, Calif.

[73] Assignee: Infoseek Corporation, Sunnyvale, Calif.

[21] Appl. No.: 604,584

[22] Filed: Feb. 21, 1996

[51] Int. Cl.$^6$ .................................................. G06F 17/30
[52] U.S. Cl. ............................... 707/10; 707/104; 707/2; 395/200.33
[58] Field of Search ..................................... 395/326, 602, 395/793, 610, 800, 187.01, 200.36, 200.48, 200.33; 345/335; 707/5, 9; 702/2, 104, 10

[56] References Cited

U.S. PATENT DOCUMENTS

| | | | |
|---|---|---|---|
| 5,572,643 | 11/1996 | Judson | 395/793 |
| 5,710,918 | 1/1998 | Lagarde et al. | 707/10 |
| 5,751,956 | 5/1998 | Kirsch | 395/200.33 |
| 5,752,246 | 5/1998 | Rogers et al. | 707/10 |
| 5,761,499 | 6/1998 | Sonderegger | 707/10 |

OTHER PUBLICATIONS

Cole et al. "Oracle Spins Web Strategy", Network World, v12, n3, pp. 1 & 49, Jan. 16, 1995.
Davis, Jessica "EMail World/Internet Expo to Feature Web Solutions", v18, n8, p. 6, Feb. 19, 1996.
Berners–Lee "The World–Wide Web", Communications of the ACM, v37, n8, pp. 76–82, Aug. 1994.
Nadile, Lisa "Adobe Targets Mac Web Development", PC Week, v12, n40, p62(1), Oct. 9, 1995.
Snell, Jason "Webtop Publishing Here at Last", MacUser, v11, n12, p44(2), Dec. 1995.

*Primary Examiner*—Wayne Amsbury
*Assistant Examiner*—Charles L. Rones
*Attorney, Agent, or Firm*—Fliesler, Dubb, Meyer & Lovejoy

[57] ABSTRACT

An information locator system providing for the expedient acquisition, validation and updating of information locators in a heterogenous network protocol environment. The locator system includes an information location discrimination engine coupleable to a network operating in the heterogeneous network protocol environment, a validation engine coupled to the information location discrimination engine to receive information locators and a database providing for the storage of information locators as discrete searchable resource locators. The validation engine is also connected to the data base for retrieving and storing resource locators. The validation engine provides for the autonomous interrogation of the heterogeneous network protocol environment to validate a predetermined information locator as a corresponding resource locator that is unique to the discrete searchable resource locators then stored by the database. Where a valid and inferred unique information locator is found, the validation engine provides a corresponding resource locator to the data base for subsequently searchable storage.

10 Claims, 3 Drawing Sheets

WEB SCAN PROCESS

CROSS-REFERENCE TO RELATED APPLICATIONS

The present application is related to the following Application, assigned to the Assignee of the present Application:

1) METHOD AND APPARATUS FOR REDIRECTION OF SERVER EXTERNAL HYPER-LINK REFERENCES, invented by Kirsch, U.S. Pat. No. 5,751,956, filed concurrently herewith, and 2) SECURE, CONVENIENT AND EFFICIENT SYSTEM AND METHOD OF PERFORMING TRANS-INTERNET PURCHASE TRANSACTIONS, invented by Kirsch, application Ser. No. 08/604,506, filed concurrently herewith.

BACKGROUND OF THE INVENTION

1. Field of the Invention

The present invention is generally related to systems for discriminating and organizing informational locators or key references obtained from source information and, in particular, to a system and process for expediently developing locators of independently distributed information accessible through a heterogeneous protocol network, such as the Internet.

2. Description of the Related Art

The national and international packet switched public network generically referred to as the Internet has existed for some time. Although often referred to as a single technological entity, the Internet is represented by a substantial complex of communication systems ranging from conventional analog and digital telephone lines through fiber optic, microwave and satellite communications links. The physical structure of the Internet is logically unified through the establishment of common information transport protocols and addressing and resource referencing schemes that allow quite disparate computer systems to communicate both locally and internationally with one another.

Common information transport protocols include the basic file transfer protocol (FTP) and simple mail transfer protocol (SMTP). Other information transport protocols that are progressively more interactive, particularly in a visual manner, include the comparatively simple telnet protocol and the typically telnet based gopher information request and retrieval service.

Recently, a new information transport protocol, known as the hypertext transfer protocol (HTTP), has been widely accepted on the Internet. This transport protocol is utilized to support a graphically interactive distributed information system variously known as the World Wide Web (WWW or W3) or simply as "the Web." The HTTP protocol provides for the transfer of both textual and graphical information via the Internet in a coordinated manner based on a system of client web page browser requests and remote web page server information responses. An HTTP session is established between a client browser and page server based on an HTTP transaction initiated in response to a browser reference to a uniform resource locator (URL). The URL system was comparatively recently established to provide a convenient and de-facto standardized format by which different Internet based or accessed information sources can be identified by type, and therefore inferentially by access transport protocol. In general, URLs have the following form:

<protocol identifier>://<protocol server address>/<qualifier>

Typical protocol identifiers include FTP, Gopher, HTTP, and News. The protocol server address typically is of the form "prefix.domain," where the prefix is typically "www" for web servers and "ftp" for FTP servers. The "domain" is the standard Internet sub-domain.top_level-domain of the server. Optional qualifiers may be provided to specify, for example, a particular hypertext page maintained by a web server or a sub-directory accessible through an FTP server.

Internet protocols such as FTP, Gopher and HTTP provide access typically to generally static information sources. The information is not entirely static, but rather typified by a static basic URL that provides referential access to information that is substantially persistent and typically updated or expanded on a periodic basis. Other Internet transport protocols exist to support dynamic information sources. These dynamic information sources are typified as highly fluid streams of information, often defined as articles or messages, exchanged via the Internet. In general, the content of these information streams is not persistent at least in the sense that the information is not immediately organized and accessible, if ever, through generally static URLs.

A principle dynamic information source is the network news as transported over the Internet using the network news transfer protocol (NNTP). The network news system, historically referred to as Usenet, provides for the successively up stream and down stream propagation of news articles between interconnected computer systems. Specifically, news articles are posted to logically defined news groups and are propagated generally via the Internet to other computer systems that temporarily store the articles subject to expiration rules. Each participating computer system also serves to propagate the articles to other computer systems that have not previously received the propagating news articles.

Another and again historically older dynamic information source is provided by independently operating list servers (ListServ) residing on computer systems that are, in general, connected to the Internet. A list server is a typically automated service that functions autonomously to repeat electronic mail messages received by a publicly-known list server E-Mail account to an established list of subscribers known to the list server by explicit or fully qualified E-Mail addresses. The list server is thus an automated electronic remailer that allows a one to many distribution of E-Mail messages through the indirection operation of the list server. The remailing of E-Mail messages is typically dynamic and, therefore, persistent messages are maintained, if at all, selectively by the subscribers of a particular mailing list. Furthermore, the list servers are themselves subject to extreme variability in location and operation since only a publicly available dedicated E-Mail address is required in substance to operate a list server.

The ability to simply track if not expediently search for information available via the Internet has not kept pace with the rapid expansion of information available via the Internet. One predominant source of new information appears as essentially static web pages. Various automatons, often generally referred to as "web crawlers," have been developed to incrementally trace through URLs embedded in the various web pages and thereby develop an information map of available information resources within the logical web space. Since the Web is not entirely static, but rather greatly increasing in its extent and complexity on a continuing basis, web crawlers face a daunting task in repeatedly tracing out and maintaining a web space map of URLs.

Simply tracing through all URLs available via the web is not practical if only in terms of the time and cost required to actually complete a trace before substantial portions of the map are antiquated by the addition and gradual revision of web URLs. Some estimates of the size of the Web place the number of presently active URLs at greater than about 50 million and growing rapidly. Furthermore, any such incremental tracing must be, by any practical definition, incomplete. A URL trace must contend with problems of infinite depth due to URL mutual references and reference looping, made further complex by the existence of URL aliases. A trace must also deal with discrete discontinuities that inherently exist at any given time in the basic structure of the URL defined web space. Normally a self contained or only outwardly directed island (connected group) of URL references may exist either by choice or as a consequence of the delay in the ponderous operation of web crawlers before discovering a URL trace that leads to a URL island. This tracing delay is conventionally reduced by trimming the depth at which URLs are traced from a base URL. However, this strategy actually results in an increased likelihood of more islands existing with a greater distribution of and even larger islands of URLs being excluded from the URL map created by a web crawler.

A class of Internet business services (IBS) has developed to deal with the problems of locating information available through the Internet. These business services characteristically utilize web crawlers to establish searchable web space maps. These maps, in turn, are made available on the Internet typically through an advertising supported or user-fee based search engine interface accessible via a defined web page. One well-known and one of the oldest Web searching systems is provided by Lycos, Inc.® (www.lycos.com). Completeness and timeliness of the listing of information resources available through the Internet is of paramount concern to such Internet business services. These problems are of particular importance since the newest sources of information are often the most important to subscribers of such Internet business services. A related problem is in identifying for the subscriber the most active of current interest information sources. The ability to ensure the completeness, timeliness and currentness of the searchable information available through an Internet business service is therefore highly desirable. However, because of the fundamental nature of web crawlers and the fully distributed nature of the web space, no direct method or system of achieving these goals is conventionally known. For example, Lycos has developed a search strategy based on conducting an essentially random search of URLs tempered by preferences. These preferences allow for the explicit or manual specification of starting URLs to include in the search and generally automated efforts by the search engine to identify and traverse Web server home pages, Web pages with substantial external links, user home pages and URL that are short, suggestive of a logical if not actual server hierarchy of Web pages. However, the Lycos search system is otherwise limited to the identification of URLs from the pages selected for traversal. The application of these preferences, the practical limitation of the depth of URL search and the randomness of the URL tracing operation may all act to inadvertently limit or at least substantially delay the inclusion of new Web URLs and even entire Web islands into the Web map space traced by the Lycos Web crawler.

SUMMARY OF THE INVENTION

Thus, a general purpose of the present invention is to provide a system and method of identifying and verifying new resource locators of static or comparatively static information culled from dynamic sources of information.

This is achieved by the present invention through an information locator system providing for the expedient acquisition and validation of information locators in a heterogenous network protocol environment. The locator system includes an information location discrimination engine coupleable to a network operating in the heterogeneous network protocol environment, a validation engine coupled to the information location discrimination engine to receive information locators and a database providing for the storage of information locators as discrete searchable resource locators. The validation engine is also connected to the database for retrieving and storing resource locators. The validation engine provides for the autonomous interrogation of the heterogeneous network protocol environment to validate a predetermined information locator as a corresponding resource locator that is unique among discrete searchable resource locators then stored by the database. Where a valid and inferred unique information locator is found, the validation engine provides a corresponding resource locator to the database for subsequently searchable storage.

To support the currentness of the database, an update and purge algorithm is also associated with the validation engine for periodically updating or removing obsolete or invalid resource locators from the database.

Thus, an advantage of the present invention is that a dynamic source of information is used to identify new, rapidly changing and frequently referenced resource locators Another advantage of the present invention is that one or more dynamic sources of information can be mutually referenced to identify potential resource locators and that existing sources of information and database stores of resource locators can be utilized to screen for and verify unique resource locators that are then added to the resource locator database.

A further advantage of the present invention is that the resource locator database is searchable both for supporting the validation of unique resource locators and for supporting contextually based database searches for resource locator references.

Still another advantage of the present invention is that multiple sources of information, each transported via a corresponding network protocol, can be dynamically filtered for potential resource locators.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
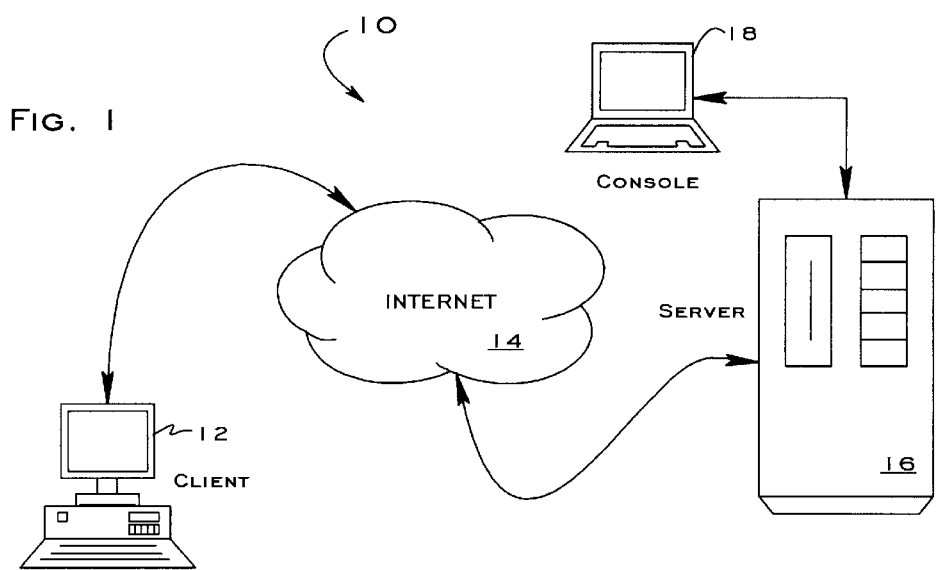
FIG. 1 illustrates a client/server system architecture utilizing heterogeneous protocols in a networking environment.

A typical environment 10 utilizing the Internet for network services is shown in FIG. 1. A client computer system 12 is coupled directly or through an Internet service provider (ISP) to the Internet 14. By logical reference, a uniform resource locator corresponding to an Internet server system 16, 18 may be accessed. Provided that a common protocol is supported and mutual access permissions are met, a transaction between the client 12 and server 16 can be initiated.

Figure 2:
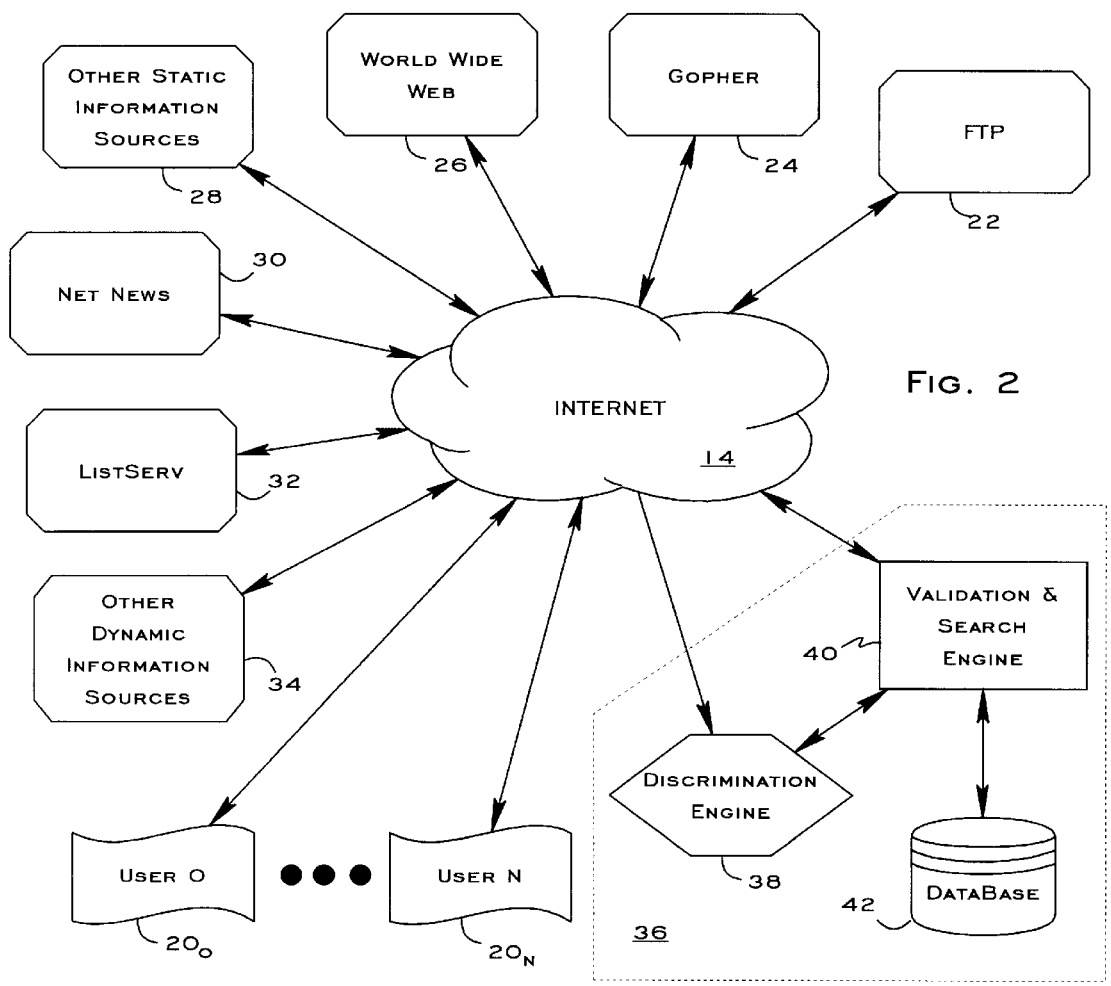
FIG. 2 illustrates multiple static and dynamic data sources as available through the Internet network.

As graphically illustrated in FIG. 2, client users $20_0$–$20_n$ have logically transparent access via the Internet 14 to a wide array of information sources disparately served by servers coupled to the Internet 14. Different information sources including FTP 22, Gopher 24, World Wide Web 26 and other static information sources 28 exist as persistent information sources available to the users $20_{0-n}$. Net News 30, ListServ 32, and other dynamic information sources 34 provide typically subscriber based information on an on-going basis to the users $20_{0-n}$ according to respective subscription profiles.

An Internet business service 36, in accordance with a preferred embodiment of the present invention, is coupled to the Internet 14 to obtain access to both the static and dynamic sources of information. By the same connection, the Internet business service 36 is also itself accessible as a static information source to the users $20_{0-n}$ via the Internet 14.

In accordance with a preferred embodiment of the present invention, a discrimination engine 38 is provided to process the dynamic information sources 30, 32, 34 to identify information resource locators typically in the form of URLs. Preferably, a full feed of Network news 30 is routed to the discrimination engine 38 by subscription established by the Internet business service 36 with an up stream Internet service provider. Net News articles are thereby directed to the discrimination engine 38 on an as propagated basis via the Internet 14. At present, full Net News feed 30 transports up to 1 gigabyte or more of information per day.

The discrimination engine 38 preferably implements a conventional regular expression parser that filters the Net News article stream for occurrences of information resource locators. In the preferred embodiment of the present invention, properly formed uniform resource locators are identified by the parser and extracted from the Net News article stream by the discrimination engine 38. Additionally, the discrimination engine 38 may implement the parser to recognize incompletely formed URLs. For example, a text sequence constructed as www.sub-domain.top-level-domain (where sub-domain is an identifier and top-level-domain can be edu, gov, org, corn or a two-letter country code) may be recognized as an implied HTTP URL. Similarly, a text stream of the form ftp.sub-domain.top-level-domain may be recognized as an implied FTP resource locator. Accordingly, the parser within the discrimination engine 38 can be made to utilize assumptions about the proper form of an information resource locator generally consistent with the assumptions that a conventional end user $20_{0-n}$ might reasonably make.

All information resource locators identified by the discrimination engine 38 are provided to the validation and search engine 40. A corresponding URL reference is constructed, if need be, and a search is performed against a local database 42 containing a list of URLs as constructed by the Internet business service 36 utilizing web crawler techniques and the on-going operation of the present invention. Where the corresponding URL is unlisted in the database 42, the validation and search engine 40 issues a corresponding URL client request via the Internet to determine whether an information server provides a valid response. Responses indicating that the request is barred due to insufficient access privileges or that the requested information no longer exists are treated as indicating that the URL reference is invalid. Equally, the failure of any server to respond is treated as an invalidating response. If a reference is determined to be invalid for some number of consecutive attempts by the validation engine 40 to validate the reference over some time period, the information resource locator is marked as a "dead" URL and any contextual information stored by the database 42 in association with the URL is effectively purged from the database 42. Preferably, the purge threshold is set at failure of five consecutive validation attempts made within a ten day period.

Where a valid information resource locator is found, the corresponding URL and selected contextual information received as part of the validity verification are then stored in the database 42.

In a similar manner, the Internet business service 36 preferably subscribes to independently identified mailing lists managed and propagated by list servers 32 and other dynamic information sources 34. Once subscribed, the list servers 32 and other dynamic information sources 34 provide logically parallel dynamic information streams to the discrimination engine 38 of the Internet business service 36. This information is again parsed by the discrimination engine 38 to identify potential information resource locators.

The database 42 is initially built, in accordance with a preferred embodiment of the present invention, through the operation of a conventional web crawler modified in a conventional manner to limit recursive crawl to a URL reference depth of five. Although other crawl depths could be used, a depth of five has been empirically established as adequate when used in conjunction with the present invention. New URLs identified from the dynamic information sources are provided in an effective manner to the web crawler of the present invention for further exploration. Consequently, the direct operation of the depth-five web crawler is sufficient and appropriate for identifying new information resources that exist in active areas. The present invention, by operation on dynamic information sources, serves to rapidly identify new, changed and currently active information resources as they are announced dynamically. Furthermore, multiple references and changed or corrected resource locators are also expediently collected from the dynamic information sources. The database 42 developed through the operation of the present invention is thereby maintained in a complete, timely and current manner.

Figure 3:
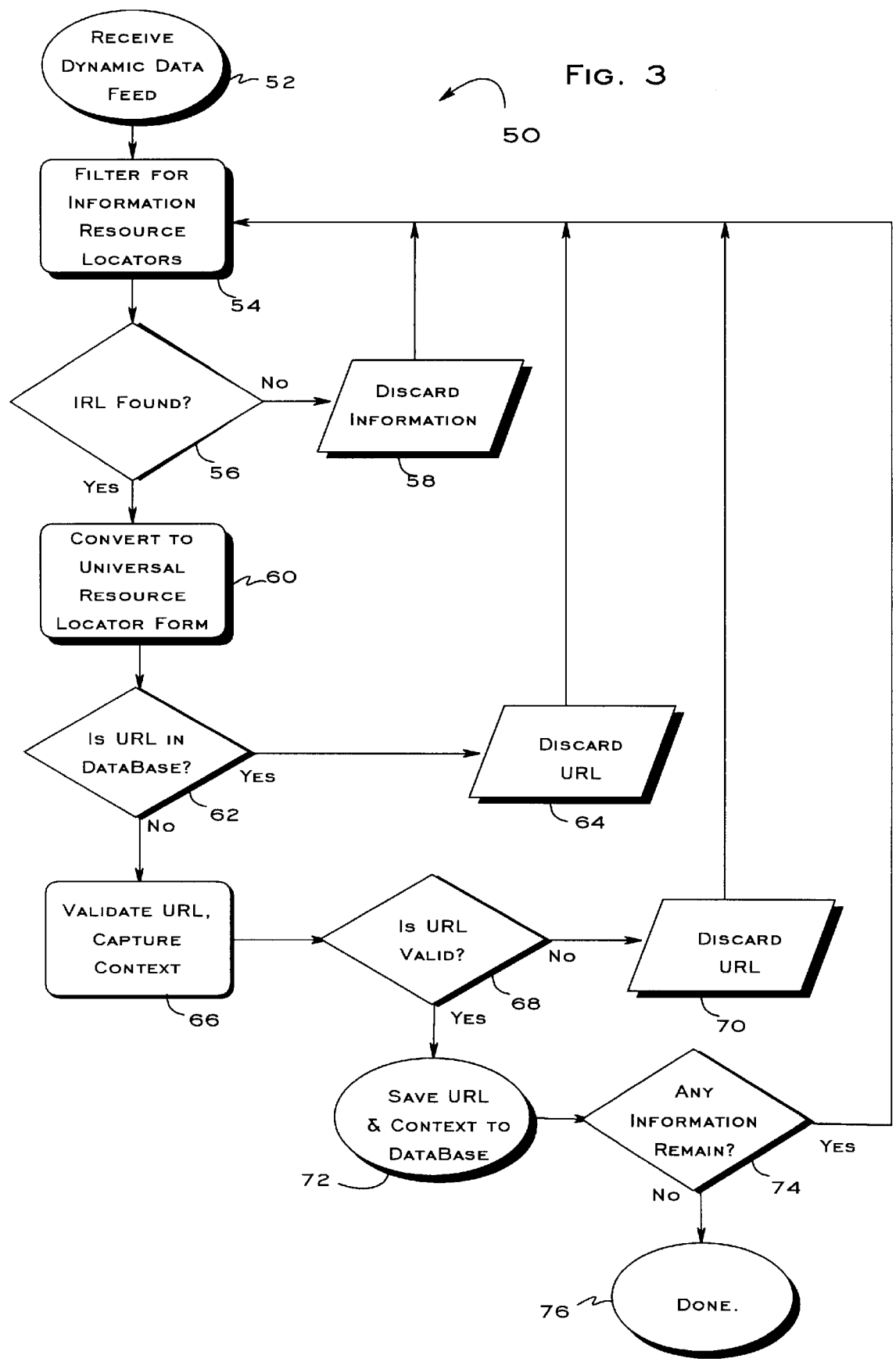
FIG. 3 is a flow diagram of the discrimination and validation of new resource locators from dynamic data sources in accordance with a preferred embodiment of the present invention.

The preferred method 50 of processing data received via dynamic information sources is shown in FIG. 3. Information received from a dynamic data feed 52 is processed through a general regular expression parser to filter and identify information resource locators 54 within the data feed. Where an information resource locator (IRL) is not found within a packet of data received from the feed 56, the data packet is discarded 58 and the next packet is examined 54.

Where an information resource locator is identified, the form of the resource locator is converted as necessary and if possible to a uniform resource locator form 60. The database 42 is then searched 62 to determine whether the URL previously exists in the database 42. If the URL exists in the database 42, the IRL is discarded 64. The database 42 may, none the less, be updated to reflect a repeated reference of the URL, thereby indicating degree of current activity and the interest in and relative importance of the URL. Accordingly, a repeated reference count field associated with the URL in the database 42 can be incremented with each repeated dynamic URL reference.

Where the URL is not found in the database 42, a client request is made to the Internet 14 to retrieve information from the URL at 66. If no valid response to the URL client request is received 68, the IRL is again discarded 70.

Where the URL is determined to be valid, the URL and a contextually appropriate sampling of the information returned by the URL client request are saved to the database 42 at 72. If any information packets from the dynamic data feed remain 74 the next data packet is examined 54. Otherwise, the process terminates 76 generally until the dynamic data feed 52 resumes.

Figure 4:
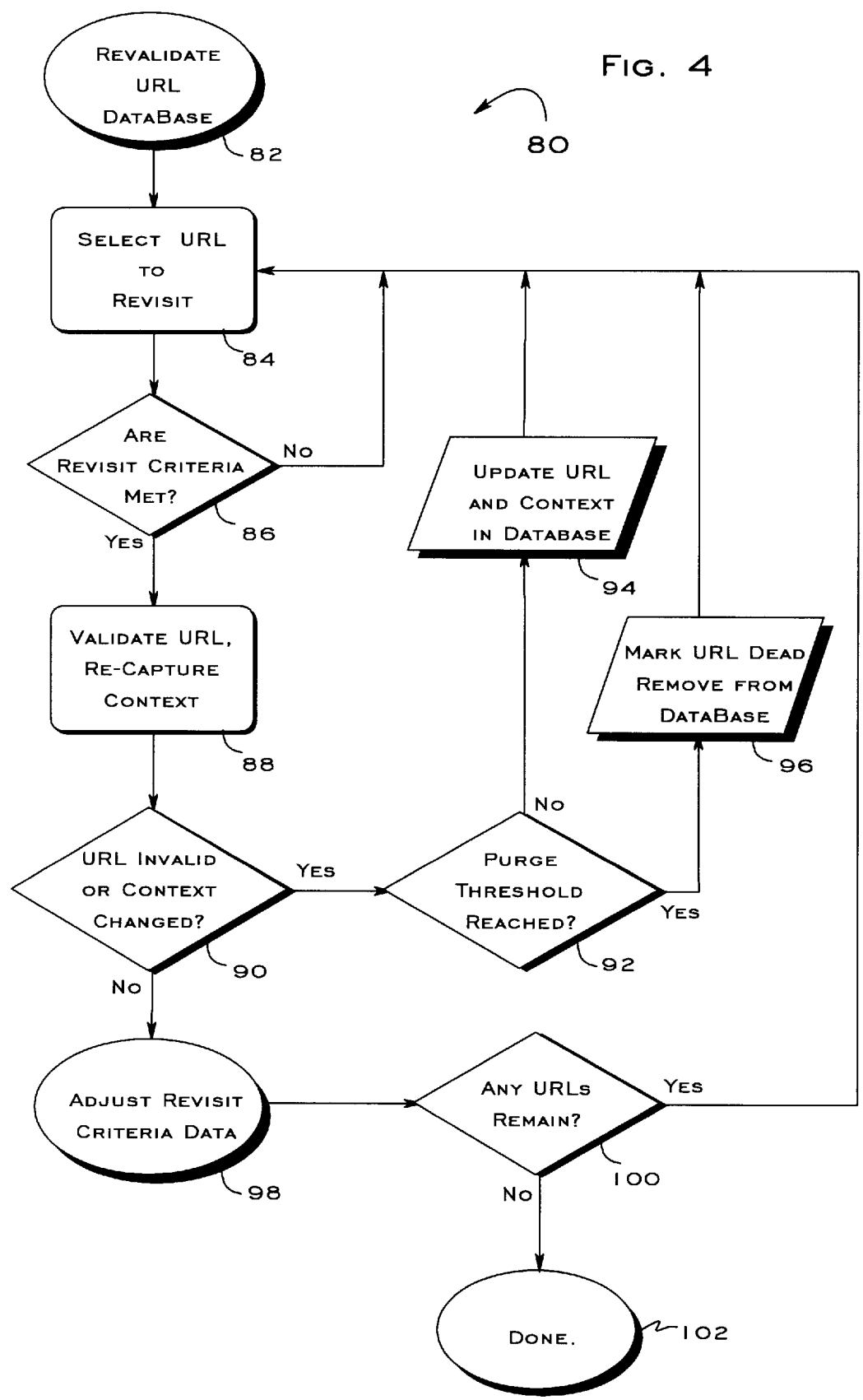
FIG. 4 is a flow diagram of a purge process through selective revalidation of resource locators previously stored in the resource locator database in accordance with a preferred embodiment of the present invention.

In accordance with a preferred embodiment of the present invention, the URLs identified from the dynamic information sources via the process 50 are further explored by the depth-five web crawler in combination with the execution of a revalidation process 80, as shown in FIG. 4. The modified web crawler is initiated to revalidate the URL database 82 on a periodic basis, if not continuously. As part of the programmed operation of the web crawler, a URL is selected from the database 42 for consideration as to whether to purge the selected URL from the database 42 at 84. The determination is made based on an initial evaluation of the purge characteristics established with the URL. These characteristics are stored as data fields associated with the URL in the database 42. These characteristic fields may store information relating to the URL including an indication of the age of the URL since the URL was first identified by the service 36, the frequency that the content associated with the URL changes as discovered through the process of validation, the frequency that the URL has moved, the number of failed responses within the current threshold purge period. These and other similar characteristics may be utilized in combination to determine how frequently the modified web crawler should operate to revalidate a particular URL. Where the characteristics necessary for the web crawler to revisit the URL as part of the validation/purge process are not met 86, a next URL is selected 84.

Where a URL has been newly added to the database 42, a default period of approximately one week is established as the frequency of revalidating the URL. However, the first time that the modified web crawler considers a newly added URL, the revisit and database update characteristics are by definition met, in order to force revalidation and to ensure that any deeper URLs associated with this new URL are immediately explored by the modified web crawler and, as appropriate, are each in turn added to the database 42.

Thus, the process 80 operates to revalidate a new or appropriately aged URL at 88. A URL client request is issued to the Internet 14 and any appropriate server response is captured and filtered for context for comparison against any prior version of the URL context as stored in the database 42. Where the selected URL is valid and the received context has not been changed, the age and other characteristics relating to the revisit/purge criteria determination are adjusted or updated at 98 in the database 42. If any unexplored URLs remain in the database 42 at 100, another URL is selected 84. Otherwise, the current iteration of revalidation of the database 42 is complete 98.

Where no valid response is received back from the URL server, or the context derived from the response received differs from the context stored by the database 42, the process 80 then determines whether, for an invalid response at 92, the purge threshold criteria for the URL has been reached. Where the purge criteria have not been met or only the context associated with the URL has changed, the URL revisit related data and update frequency data associated with the URL are modified in the database 42 at 94. specifically, a new period for revisiting the URL is calculated based on an average of the rate of change of the URL context, the number of invalid responses in the current validation period is accounted for or reset, and any new context is updated to the database 42. Where the context has changed, any URLs referenced in the new context are explored by the modified web crawler beginning at 84.

Once the purge threshold criteria has been met following an invalid URL server response, the URL is marked as "dead" and the associated context is purged from the database 42 at 96. The process 80 then resumes with the selection of a next URL from the database 94 to potentially revisit at 84.

Thus, a comprehensive system for maintaining a resource locator map describing information resources accessible through the Internet and identified through the combined examination of both static and dynamic information sources has been described.

While the invention has been particularly shown and described with reference to preferred embodiments thereof it will be understood by those skilled in the art that various changes in form and details may be made therein without departing from the spirit and scope of the invention as defined by the appended claims.

I claim:

1. A system of autonomously maintaining a searchable database of information accessible over the Internet, said system comprising:

a) a discrimination system coupleable to the Internet to receive messages including electronic mail messages and network news messages, said discrimination processing said electronic mail and network news messages to identify embedded URLs; and b) a validation system coupleable to the Internet, said validation system coupled to said discrimination system to receive a predetermined embedded URL, said validation system enabling an access of the Internet to retrieve Web page information associated with said predetermined embedded URL; and c) a database for searchably storing said predetermined embedded URL in association with the Web page information associated with said predetermined embedded URL.

2. The system of claim 1 wherein said validation system determines whether said predetermined embedded URL is then stored in said database and, if so stored, whether Web page information corresponding to said predetermined embedded URL then retrieved from the Internet matches Web page information corresponding to said predetermined embedded URL then stored by said data base, and if not matching, said validation system operates to update said database to store the Web page information corresponding to said predetermined embedded URL then retrieved from the Internet.

3. The system of claim 2 wherein said validation system additionally stores change data in said database associated with said predetermined embedded URL, said validation system updating said change data to reflect the frequency of validation system match failures.

4. The system of claim 3 wherein said validation system selects said predetermined embedded URL from said database based on said change data associated with said predetermined URL, said validation system operating to determine whether Web page information corresponding to said predetermined embedded URL then retrieved from the Internet matches Web page information corresponding to said predetermined embedded URL then stored by said data base, and if not matching, said validation system operates to update said database to store the Web page information corresponding to said predetermined embedded URL then retrieved from the Internet.

5. The system of claim 4 wherein said validation system further operates to purge said predetermined embedded URL and associated Web page information from said database when said predetermined embedded URL is repeatedly determined to be invalid within a predetermined period of time.

6. A method of maintaining the currentness of a listing of URLs used to establish a searchable state of at least a portion of the Internet, said method comprising the steps of:
 a) associating predetermined volatility data with a predetermined URL within a list of URLs;
 b) associating predetermined contextual data with said predetermined URL; and
 c) periodically validating the currentness of said predetermined URL, including
  i) determining whether said predetermined volatility data corresponds to predetermined validation criteria;
  ii) determining the validity of said predetermined URL;
  iii) determining the currentness of said predetermined contextual data associated with said predetermined URL where said predetermined URL is determined to be valid
  iv) accessing at least a portion of the Internet to update said predetermined contextual data associated with said predetermined URL where said predetermined contextual data is determined to be not current; and
  iv) updating said predetermined volatility data to reflect the validity, currentness, and frequency that said predetermined contextual data is updated.

7. The method of claim 6 wherein said predetermined validation criteria is increasingly sensitive to the increasing frequency that said predetermined contextual data is determined to be not current.

8. The method of claim 7 wherein said step of periodically validating the currentness of said predetermined URL is performed with a frequency approximately equal to or greater than the update frequency reflected in said predetermined volatility data.

9. The method of claim 8 further comprising the steps of:
 a) adding a new predetermined URL to said list of URLs; and
 b) associating new predetermined volatility data with said new predetermined URL, wherein new predetermined contextual data is obtained from the Internet and wherein the initial frequency that said new predetermined contextual data is updated is initially set to a default value.

10. The method of claim 9 further comprising the steps of:
 a) processing data from a plurality of heterogeneous data resources available via the Internet to identify said new predetermined URL;
 b) determining the validity of said new predetermined URL; and
 c) accessing at least a portion of the Internet to obtain said new predetermined contextual data associated with said new predetermined URL.

* * * * *